(12) United States Patent
Noda (10) Patent No.: US 7,936,158 B2
(45) Date of Patent: May 3, 2011

(54) SWITCHING REGULATOR CONFIGURED TO DETECT AND SHUTDOWN REVERSE CURRENT

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 301 days.

(21) Appl. No.: 12/204,202

(22) Filed: Sep. 4, 2008

(65) Prior Publication Data

US 2009/0066305 A1    Mar. 12, 2009

(30) Foreign Application Priority Data

Sep. 11, 2007   (JP) ................... 2007-235065

(51) Int. Cl.
G05F 1/40 (2006.01)
G05F 1/56 (2006.01)
(52) U.S. Cl. ......... 323/282; 323/284; 323/285; 323/908
(58) Field of Classification Search .................. 323/282, 323/284, 285, 908
See application file for complete search history.

(56) References Cited

U.S. PATENT DOCUMENTS

| | | | |
|---|---|---|---|
| 6,275,014 B1 * | 8/2001 | Sudo | 323/222 |
| 6,437,549 B1 * | 8/2002 | Takagishi | 323/282 |
| 6,541,947 B1 * | 4/2003 | Dittmer et al. | 323/284 |
| 6,580,258 B2 * | 6/2003 | Wilcox et al. | 323/282 |
| 6,674,272 B2 * | 1/2004 | Hwang | 323/284 |
| 6,965,219 B2 * | 11/2005 | Brooks et al. | 323/282 |
| 7,432,688 B2 * | 10/2008 | Liu et al. | 323/224 |
| 2004/0264214 A1 * | 12/2004 | Xu et al. | 363/16 |
| 2005/0258889 A1 * | 11/2005 | Tolle et al. | 327/374 |
| 2006/0164057 A1 * | 7/2006 | Kudo et al. | 323/282 |
| 2007/0013351 A1 * | 1/2007 | Naka et al. | 323/241 |
| 2008/0068868 A1 * | 3/2008 | Williams | 363/21.06 |

FOREIGN PATENT DOCUMENTS

JP   2006-333689   12/2006
JP   4031507      10/2007

* cited by examiner

*Primary Examiner* — Bao Q Vu
(74) *Attorney, Agent, or Firm* — Cooper & Dunham LLP (57) ABSTRACT

A switching regulator includes a first switch, an inductor, a second switch, a controller to control a switching operation by switching the first switch and switching the second switch complementally to the first switch, and a reverse current detector to detect a reverse current that flows from an output terminal toward the second switch. The reverse current detector generates a proportional voltage that is proportional to a voltage at a junction node between the second switch and the inductor, and detects a generation or an indication of the reverse current based on the proportional voltage. The controller turns the second switch off to create a shutdown state when the reverse current detector detects the generation or the indication of the reverse current.

18 Claims, 9 Drawing Sheets

SWITCHING REGULATOR CONFIGURED TO DETECT AND SHUTDOWN REVERSE CURRENT

TECHNICAL FIELD

The present disclosure relates to a switching regulator, and more particularly, to a switching regulator capable of preventing reverse current.

BACKGROUND ART

Recently, energy saving has been actively promoted to protect the environment. For battery-powered portable equipment, such as mobile phones, digital cameras, and the like, energy efficiency is especially important to prolong battery life. Such portable equipment typically uses a switching regulator that includes an inductor because it is efficient and can be made compact.

Figure 1:
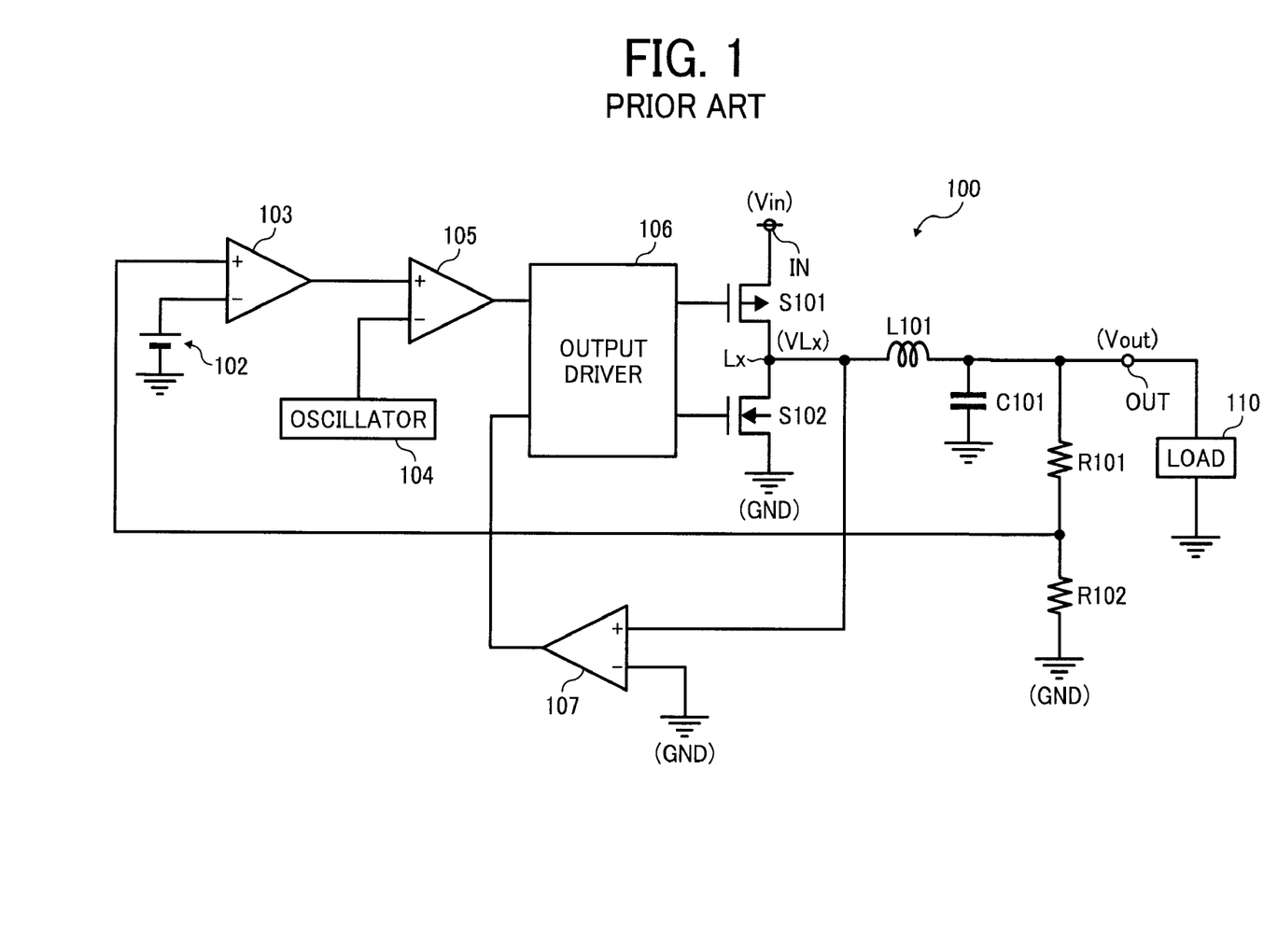
FIG. 1 is circuit diagram of a known switching regulator.

FIG. 1 is a circuit diagram of a known switching regulator. The switching regulator 100 is a step-down synchronous-rectification type switching regulator. In FIG. 1, the switching regulator 100 includes a switching transistor S101, a synchronous rectification transistor S102, an inductor L101, an output capacitor C101, comparators 103, 105, and 107, an oscillator 104, an output driver 106, and bleeder resistors R101 and R102. A load 110 is connected between an output terminal OUT (Vout) and ground.

The switching regulator 100 operates in a continuity mode and a discontinuity mode. In the continuity mode, a current flows through the inductor L101 continuously. By contrast, in the discontinuity mode, the current does not flow through the inductor L 101 continuously. Consequently, when the switching regulator operates in the discontinuity mode under light load conditions, a reverse current may flow from the output, terminal OUT to ground through the synchronous rectification transistor S102.

To avoid such reverse current, the switching regulator 100 employs the comparator 107 which compares a voltage VLx at a junction node Lx between the switching transistor S101 and the synchronous rectification transistor S102 with a ground potential GND. When the voltage VLx at the junction node Lx exceeds the ground potential GND, the synchronous rectification transistor S102 is cut off so that the reverse current is avoided.

However, in the switching regulator 100 shown in FIG. 1, the synchronous rectification transistor S102 may not be cut off before generation of the reverse current due to a delay at the comparator 107, resulting in the reverse current flowing from the output terminal OUT to the inductor L101. As a result, performance efficiency of the switching regulator decreases.

The ground potential GND input to inverted input terminal of the comparator 107 may be replaced by a low voltage that is lower than the ground potential GND by a predetermined voltage. Then, the comparator 107 compares the voltage VLx at the junction node Lx with the low voltage so as to detect an indication of the reverse current. Accordingly, it is possible to cut off the synchronous rectification transistor S102 before generation of the reverse current, thus avoiding the reverse current. In this switching regulator 100, however, a voltage change of the voltage VLx at the junction node Lx is relatively small with respect to time. Accordingly, it takes a long time to obtain enough of a voltage change to cause the comparator 107 to invert the output voltage thereof. To cause the comparator 107 to invert the output voltage with such small voltage change, it is necessary to increase a supply current to the comparator 107. When the supply current to the comparator 107 is increased, however, the performance efficiency of the switching regulator 100 decreases due to large power consumption under light load conditions.

BRIEF SUMMARY

This patent specification describes a novel switching regulator that includes a first switch, an inductor, a second switch, a controller to control a switching operation by switching the first switch and switching the second switch complementally to the first switch, and a reverse current detector to detect a reverse current that flows from an output terminal toward the second switch. The reverse current detector generates a proportional voltage that is proportional to a voltage at a junction node between the second switch and the inductor, and detects a generation or an indication of the reverse current based on the proportional voltage. The controller turns the second switch off to create a shutdown state when the reverse current detector detects the generation or the indication of the reverse current.

This patent specification further describes a novel switching regulator that includes a reverse current detector. The reverse current detector compares a proportional voltage with a reference voltage to detect a generation or an indication of a reverse current.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 2:
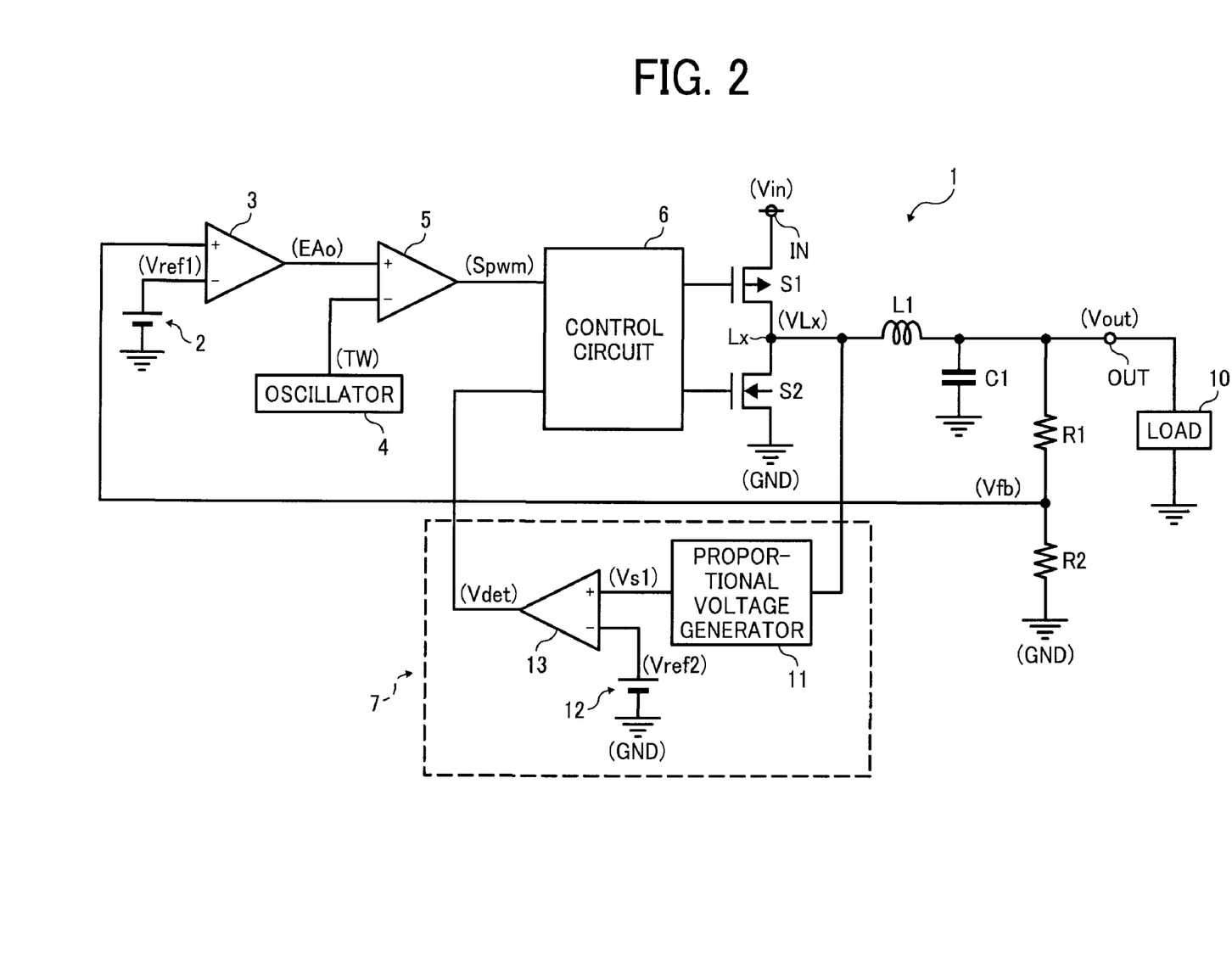
FIG. 2 a circuit diagram of a switching regulator according to a first example embodiment.

Referring now to the drawings, wherein like reference numerals designate identical or corresponding parts throughout the several views, particularly to FIG. 2, a switching regulator according to exemplary embodiment is described.

First Embodiment

FIG. 2 is a circuit diagram of a switching regulator according to a first example embodiment. The switching regulator 1 is a step-down switching regulator that converts an input voltage Vin input at an input terminal IN to a predetermined voltage, and outputs the converted voltage as an output voltage Vout from an output terminal OUT to a load 10. The switching regulator 1 includes a switching transistor S1 and a synchronous rectification transistor S2. The switching transistor S1 is a PMOS transistor, and performs a switching operation to control output of the input voltage Vin. The synchronous rectification transistor S2 is an NMOS transistor.

Further, the switching regulator 1 includes a first reference voltage generator 2, resistors R1 and R2, an inductor L1, an error amplifier 3, an oscillator 4, a PWM comparator 5, a control circuit 6, and a reverse current detector 7. The resistors R1 and R2 detect the output voltage Vout, and the control circuit 6 controls the switching transistor S1 and the synchronous rectification transistor S2. The reverse current detector 7 includes a proportional voltage generator 11, a second reference voltage generator 12 and a comparator 13.

The switching transistor S1 forms a first switching element, and the synchronous rectification transistor S2 forms a second switching element. The first reference voltage generator 2, the resistors R1 and R2, the inductor L1, the error amplifier 3, the oscillator 4, the PWM comparator 5 and the control circuit 6 together form a control circuit unit. The reverse current detector 7 forms a reverse current detection circuit unit. Further, the second reference voltage generator 12 forms a second reference voltage generation circuit unit, and the comparator 13 forms a reverse current detection circuit.

Excepting the inductor L1 and a capacitor C1, all the circuit elements may be integrated on a single chip. Further, excepting switching transistor S1, the synchronous rectification transistor S2, the inductor L1 and a capacitor C1, all the circuit elements may be integrated on a single chip.

The first reference voltage generator 2 generates and outputs a predetermined first reference voltage Vref1. The resistors R1 and R2 generate a divided voltage Vfb by dividing the output voltage Vout, and outputs the divided voltage Vfb. The error amplifier 3 amplifies a voltage difference between the divided voltage Vfb and the first reference voltage Vref1 to generate and output an output signal EAo. The oscillator 4 generates and outputs a predetermined triangular wave signal TW. The PWM comparator 5 compares the output signal EAo with the triangular wave signal TW to generate and output a PWM pulse signal Spwm to perform a PWM control.

The control circuit 6 turns on either the switching transistor S1 or the synchronous rectification transistor S2 exclusively in accordance with the PWM pulse signal Spwm.

The reverse current detector 7 detects an indication of a reverse current that flows from the output terminal OUT to the synchronous rectification transistor S2. When the reverse current detector 7 detects an indication of the reverse current, the reverse current detector 7 outputs a predetermined signal Vdet to the control circuit 6. The control circuit 6 turns the synchronous rectification transistor S2 off to create a shutdown state so that the reverse current is prevented.

The switching transistor S1 and the synchronous rectification transistor S2 are connected in series between the input terminal IN and ground. The inductor L1 is connected between the output terminal OUT and a junction node Lx between the switching transistor S1 and the synchronous rectification transistor S2. Between the output terminal OUT and ground, the resistors R1 and R2 are connected in series and the capacitor C1 is connected in parallel. The divided voltage Vfb is output from a junction node between the resistors R1 and R2. In the error amplifier 3, the divided voltage Vfb is input to a non-inversion terminal, and the first reference voltage Vref1 is input to an inversion terminal. An output terminal of the error amplifier 3 is connected to a non-inversion terminal of the PWM comparator 5.

The triangular wave signal TW is input to an inversion terminal of the PWM comparator 5. The PWM pulse signal Spwm output from the PWM comparator 5 is input to the control circuit 6. The control circuit 6 outputs control signals to each gate of the switching transistor S1 and the synchronous rectification transistor S2 for operational control thereof.

The voltage VLx at the junction node Lx between the switching transistor S1 and the synchronous rectification transistor S2 is input to the proportional voltage generator 11 so that the proportional voltage generator 11 generates and outputs a proportional voltage Vs1 that is proportional to the voltage VLx. The second reference voltage generator 12 generates and outputs a predetermined second reference voltage Vref2. In the comparator 13, the proportional voltage Vs1 is input to a non-inversion terminal and the second reference voltage Vref2 is input to an inversion terminal. The comparator 13 generates and outputs a comparison result signal Vdet indicating a comparison result between the proportional voltage Vs1 and the second reference voltage Vref2 to the control circuit 6.

With this circuit configuration, when the proportional voltage Vs1 is below the second reference voltage Vref2, i.e., there is no indication of the reverse current from the node Lx to ground, and the comparator 13 outputs a low-level comparison result signal Vdet. Under these condition, when the output voltage Vout is increased, the output signal EAo of the error amplifier 3 decreases so that a pulse width of the PWM pulse signal Spwm output from the PWM comparator 5 changes. More specifically, the on-time of the switching transistor S1 decreases, and the on-time of the synchronization rectification transistor S2 increases. Consequently, the output voltage Vout of the switching regulator 1 is decreased.

When the output voltage Vout of the switching regulator 1 decreases, the output signal EAo of the error amplifier 3 increases. Further, the pulse width of the pulse signal Spwm from the PWM comparator 5 changes. More specifically, the on-time of the switching transistor S1 increases, and the on-time of the synchronization rectification transistor S2 decreases. Consequently, the output voltage Vout of the switching regulator 1 is increased.

The above operations are repeated so that the output voltage Vout is maintained at a predetermined constant voltage.

When an indication of the reverse current is detected, for example, when the proportional voltage Vs1 is higher than the second reference voltage Vref2, the comparator 13 outputs a high-level comparison result signal Vdet. The control circuit 6 then switches off the synchronization rectification transistor S2 to create a shutdown state independently of the pulse signal Spwm input from the PWM comparator 5.

Figure 3:
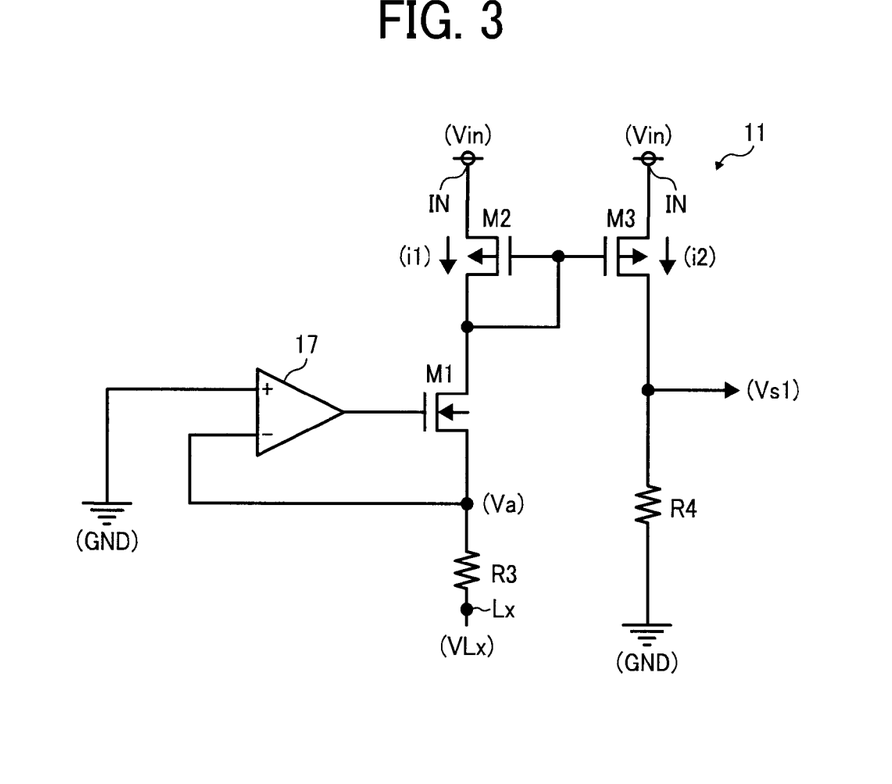
FIG. 3 is circuit diagram of a proportional voltage generator of FIG. 2.

FIG. 3 is a circuit diagram of the proportional voltage generator 11 of FIG. 2. Referring to FIG. 3, operation of the proportional voltage generator 11 will be described.

The proportional voltage generator 11 includes an operational amplifier 17, an NMOS transistor M1, PMOS transistors M2 and M3, and resistors R3 and R4. The NMOS transistor M1 forms a first transistor, the resistor R3 forms a first resistor, and the resistor R4 forms a second resistor. The PMOS transistors M2 and M3 form a current mirror circuit. Each source of the PMOS transistors M2 and M3 is connected to an input terminal IN which inputs an input voltage Vin, and each gate is connected in common and is connected to a drain of the PMOS transistor M2.

The NMOS transistor M1 and the resistor R3 are connected in series between the drain of the PMOS transistor M2 and the junction node Lx. A junction node between the NMOS transistor M1 and the resistor R3 is connected to an inversion terminal of the operational amplifier 17. A non-inversion terminal of the operational amplifier 17 is connected to ground. An output terminal of the operational amplifier 17 is connected to a gate of the NMOS transistor M1. The resistor R4 is connected between a drain of the PMOS transistor M3 and ground. The proportional voltage Vs1 is output from a junction node between the PMOS transistor M3 and the resistor R4.

Where a voltage at a junction node between the NMOS transistor M1 and the resistor R3 is "Va", a voltage across the resistor R3 is expressed as (Va−VLx). Accordingly, a current i1 flowing from the PMOS transistor M2 to the NMOS transistor M1 and the resistor R3 is expressed as $$i1 = (Va - VLx)/r3 \quad (1)$$

where resistance of the resistor R3 is r3.

A current i2 output from the PMOS transistor M3 is expressed as $$i2 = i1 \times gm3/gm2 = (gm3/gm2) \times (Va - VLx)/r3 \quad (2)$$

where transconductance of the PMOS transistors M2 is gm2 and transconductance of the PMOS transistors M3 is gm3.

The transconductance gm is generally expressed as gm=μ×Cox×W/L×(Vgs−Vth), where mobility of the MOS transistor is μ, capacitance of gate oxide is Cox, gate width is W, gate length is L, and threshold voltage is Vth.

Accordingly, the proportional voltage Vs1 is expressed as $$Vs1 = i2 \times r4 = (Va - VLx) \times (gm3/gm2) \times (r4/r3) \quad (3)$$

where resistance of the resistor R4 is r4.

The operational amplifier 17 controls the NMOS transistor M1 so that the voltage Va becomes the ground potential GND, i.e., Va=0. Therefore, formula (3) can be rewritten as $$Vs1 = k \times (-VLx) = -k \times (VLx) \quad (4)$$

where K=(gm3/gm2)×(r4/r3). Thus, the proportional voltage generator 11 outputs the proportional voltage Vs1 obtained by multiplying the voltage VLx by a factor −k. Further, |k|>1.

Figure 4:
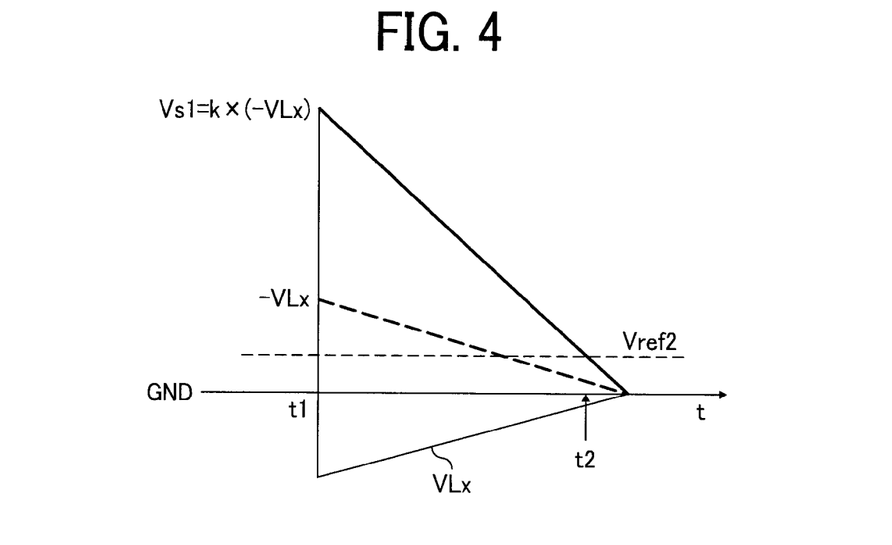
FIG. 4 is a schematic representing a relation among a proportional voltage, a reference voltage, and a voltage at a junction node between a switching transistor and a synchronous rectification transistor in the switching regulator according to the first example embodiment.

FIG. 4 is a schematic diagram representing a relation among the voltage VLx, the proportional voltage Vs1, and the second reference voltage Vref2.

In FIG. 4, at time t1, the switching transistor S1 is off and the synchronous rectification transistor S2 is on. Accordingly, the voltage VLx drops to a low voltage that is lower than the ground potential GND so that a current flows from ground to the node Lx. Energy stored in the inductor L1 discharges because the synchronous rectification transistor S2 is on. Accordingly, the voltage VLx increases. In FIG. 4, the proportional voltage Vs1 output from the proportional voltage generator 11 is shown by a bold solid line. It is found that the bold solid line is obtained from the voltage VLx. A dotted line is created by making a line symmetry of the voltage VLx about the ground potential GND. Then, the factor k is multiplied to the dotted line so as to obtain the bold solid line, i.e., Vs1.

To detect the reverse current at time t2, the second reference voltage Vref2 is determined so that a magnitude relation between the proportional voltage Vs1 and the second reference voltage Vref2 at time t2 becomes the reverse of the magnitude relation at time t1. More specifically, the proportional voltage Vs1 becomes lower than the second reference voltage Vref2 after time t2. Since a slope m1 of the line of the voltage VLx is generally expressed by the following formula:

$$m1 = Ron \times (-Vout/L) \quad (5)$$

where on-resistance of the synchronous rectification transistor S2 is Ron, and inductance of the inductor L1 is L, a slope m2 of the line of the proportional voltage Vs1 is obtained by multiplying the slope m1 by the factor −k, as follows:

$$m2 = -k \times Ron \times (-Vout/L) \quad (6)$$

In the known switching regulator 100 shown in FIG. 1, the slope of the line of the voltage VLx is relatively small with respect to time. Accordingly, an input error voltage input at each terminal of the comparator 107 is relatively small. As a result, it takes a long time for the output voltage of the comparator 107 to be inverted by the input error voltage of the comparator 107.

When a necessary input error voltage of the comparator 107 to cause the comparator 107 to invert the output voltage is defined as Verr, a delay time $T_{dly1}$ until the comparator 107 inverts the output voltage may be expressed as $$T_{dly1} = Verr/|m1| \quad (7)$$

When the delay time $T_{dly1}$ is long, it is not possible to prevent the reverse current in advance before it occurs, resulting in reduced performance efficiency of the switching regulator.

In the switching regulator according to the first example embodiment, when a necessary input error voltage that causes the comparator 13 to invert the output voltage Vdet is defined as Verr, a delay time $T_{dly2}$ until the output voltage Vdet is inverted is expressed as $$T_{dly2} = Verr/|m2| \quad (8)$$

Since |m2|=k×|m1| based on the formulas (5) and (6), the formula (8) becomes $$T_{dly2} = Verr/|m1|/k \quad (9)$$

Referring now to formula (9), it can be seen that the delay time is reduced by 1/k compared to formula (7) for the known switching regulator.

Figure 5:
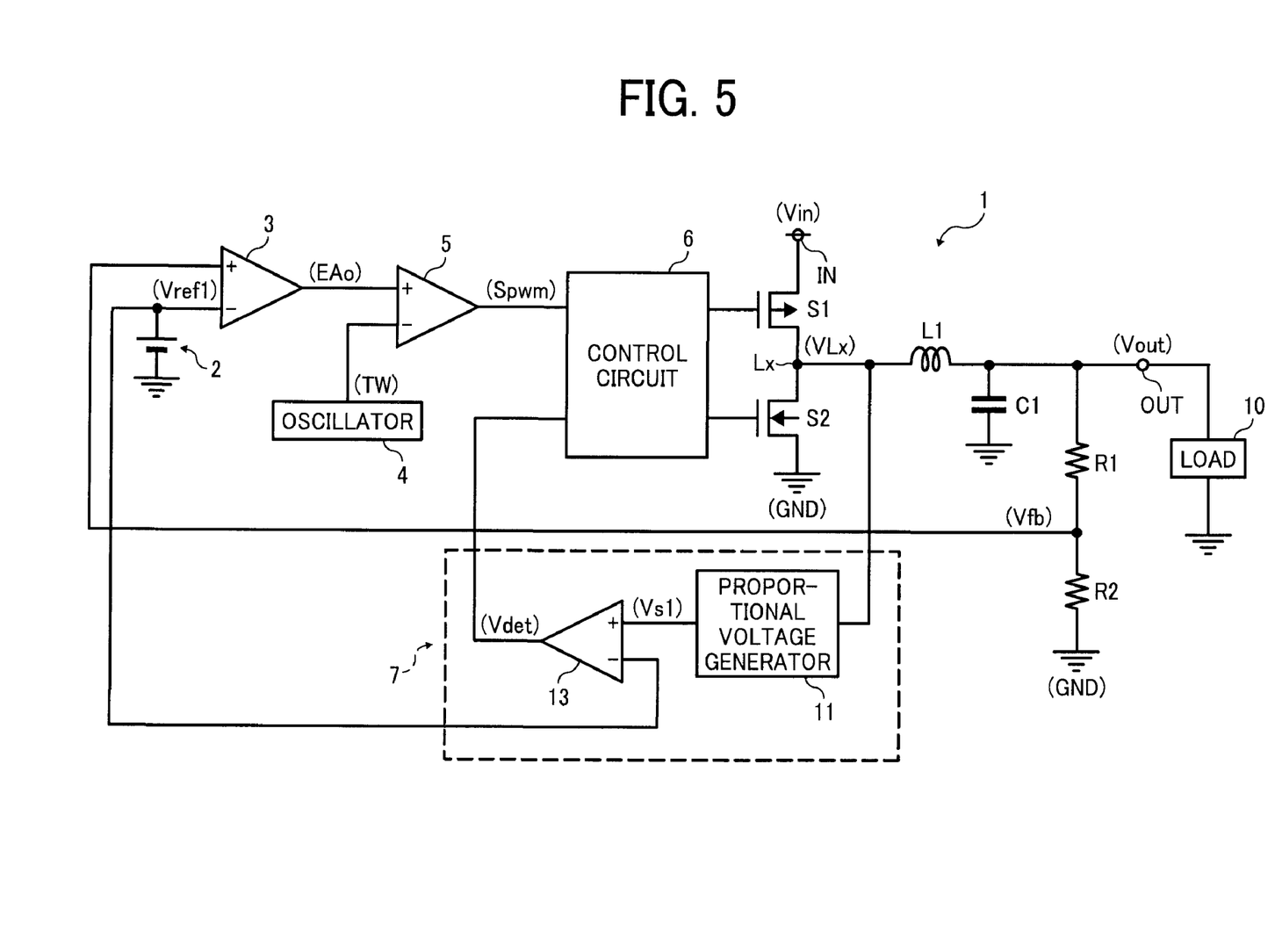
FIG. 5 is another switching regulator according to the first example embodiment.

In the switching regulator according to the first example embodiment as shown in FIG. 2, the switching regulator 1 employs the second reference voltage generator 12 that generates the second reference voltage Vref2. However, as shown in FIG. 5, the first reference voltage Vref1 may be used instead of the second reference voltage Vref2. Accordingly, the first reference voltage Vref1 is input to the inverted input terminal of the comparator 13. As a result, it is possible to simplify the circuit configuration because the second reference voltage generator 12 is not necessary, resulting in cost reduction.

As described above, in the switching regulator according to the first example embodiment, it is possible to shorten the delay time caused by the comparator 13, to shorten a required time to detect a generation of the reverse current, and to start a preventing operation to prevent the reverse current quickly when the reverse current does occur. Further, it is possible to prevent the reverse current from occurring in the first place. Consequently, it is possible to reduce power consumption of the comparator 13, resulting in even better performance efficiency of the switching regulator.

Second Embodiment

Figure 6:
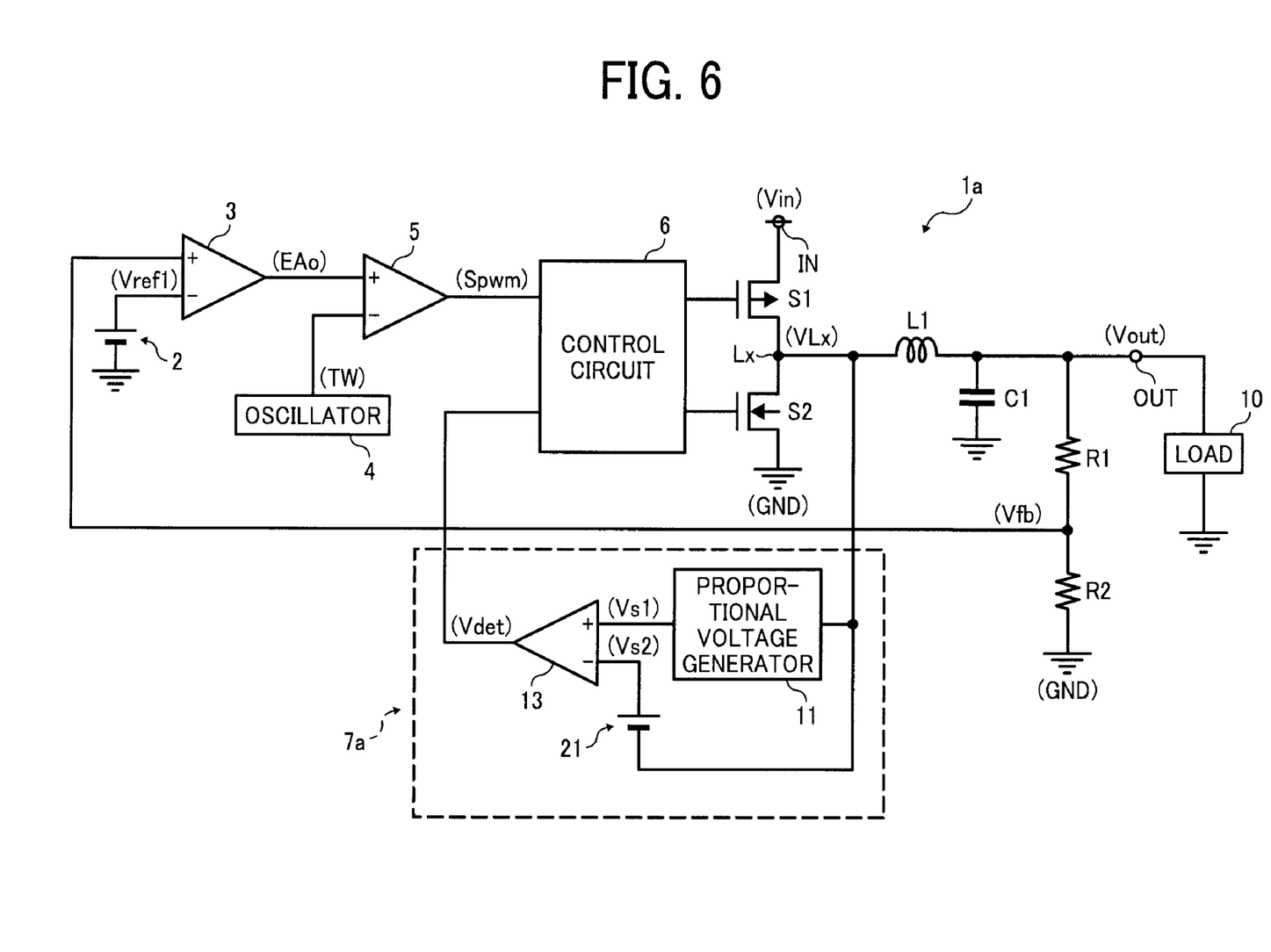
FIG. 6 is a circuit diagram of a switching regulator according to a second example embodiment.

In the switching regulator according to the first example embodiment, the second reference voltage Vref2 is input to the inversion terminal of the comparator 13. However, in a switching regulator according to a second example embodiment, a reference voltage Vs2, which is obtained by adding a predetermined voltage V1 to the voltage VLx, is used for input to the inversion terminal of the comparator 13.

FIG. 6 is a circuit diagram of the switching regulator 1a according to the second example embodiment. In FIG. 6, identical reference characters are assigned to circuit members that are identical or similar to those shown in FIG. 2 and descriptions thereof are omitted.

The switching regulator 1a shown in FIG. 6 differs from the switching regulator 1 shown in FIG. 2 in that the second reference voltage generator 12 is removed and a reference voltage generator 21 is provided between the inversion terminal of the comparator 13 and the junction node Lx. Accordingly, the reverse current detector 7 is changed to a reverse current detector 7a.

The switching regulator 1a is a step-down switching regulator which converts an input voltage Vin input at an input terminal IN to a predetermined voltage, and outputs the converted voltage as an output voltage Vout from an output terminal OUT to a load 10. The switching regulator 1a includes a switching transistor S1, a synchronous rectification transistor S2, a first reference voltage generator 2, resistors R1 and R2, an inductor L1, an error amplifier 3, an oscillator 4, a PWM comparator 5, a control circuit 6, and the reverse current detector 7a. The reverse current detector 7a forms a reverse current detection circuit unit. The reference voltage generation circuit 21 forms a second reference voltage circuit unit, and the reference voltage Vs2 forms a second reference voltage.

Excepting the inductor L1 and a capacitor C1, all the circuit elements may be integrated on a single chip. Further, excepting switching transistor S1, the synchronous rectification transistor S2, the inductor L1 and a capacitor C1, all the circuit elements may be integrated on a single chip.

The reverse current detector 7a detects an indication of a reverse current that flows from the output terminal OUT to the synchronous rectification transistor S2. When the reverse current detector 7a detects an indication of a reverse current, the reverse current detector 7a outputs a predetermined comparison result signal Vdet to the control circuit 6. The control circuit 6 switches off the synchronous rectification transistor S2 to create a shutdown state so as to prevent the reverse current.

In the comparator 13, the proportional voltage Vs1 is input to a non-inversion terminal, and the reference voltage Vs2 is input to an inversion terminal. The comparator 13 generates the comparison result signal Vdet, and outputs the comparison result signal Vdet indicating a comparison result between the proportional voltage Vs1 and the reference voltage Vs2 to the control circuit 6.

Figure 7:
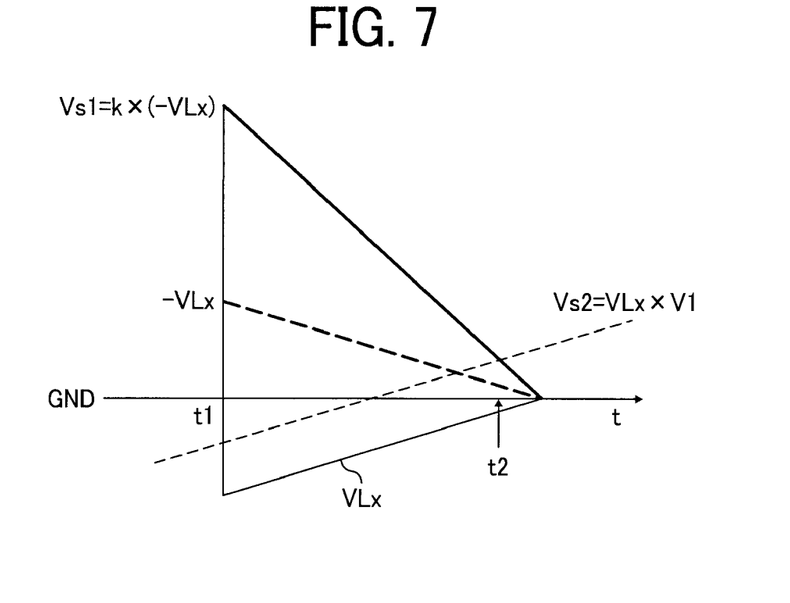
FIG. 7 is a schematic diagram representing a relation among a proportional voltage, a reference voltage, and a voltage at a junction node between a switching transistor and a synchronous rectification transistor in the switching regulator according to the second example embodiment.

FIG. 7 is a schematic diagram representing a relation among the voltage VLx, the proportional voltage Vs1, and the reference voltage Vs2 with this circuit configuration. A slope of the line of the reference voltage Vs2 (=VLx+V1) input to the non-inversion terminal of the comparator 13 is m1. Accordingly, when a necessary input error voltage with which the comparator 13 inverts the output voltage is defined as Verr, a delay time $T_{dly3}$ until the comparator 13 inverts the output voltage is $$T_{dly3} = Verr/(|m2|+|m1|) \quad (10)$$

Since $|m2|=k\times|m1|$ based on formulas (5) and (6), the formula (10) becomes a following formula (11), $$T_{dly3} = Verr/|m1|/(k+1) \quad (11)$$

Referring now to formula (11), it can be seen that the delay time can be reduced by $1/(k+1)$ compared to formula (7).

Figure 8:
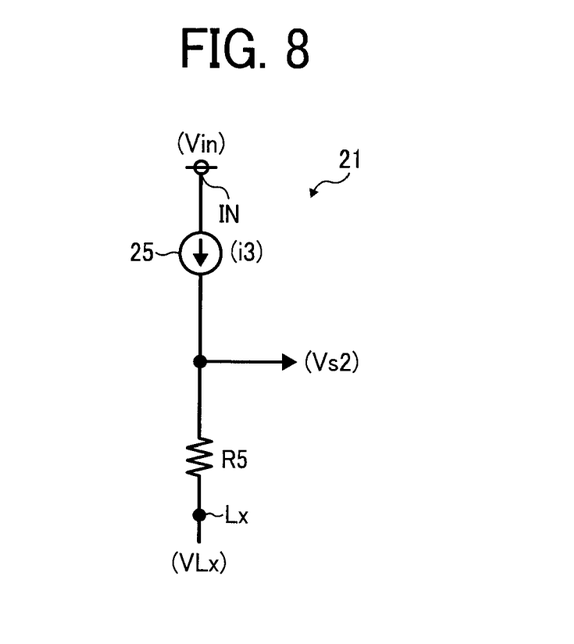
FIG. 8 is a circuit diagram of a reference voltage generation circuit.

The reference voltage generation circuit 21 can be implemented using a simple circuit like that shown in FIG. 8. In FIG. 8, the reference voltage generation circuit 21 includes a constant current source 25 and a resistor R5. The constant current source 25 generates a predetermined constant current i3. The constant current source 25 and the resistor R5 are connected in series between the input terminal IN and the junction node Lx. The reference voltage Vs2 is output from a junction node between the constant current source 25 and the resistor R5. Since a current i3 flows through the resistor R5, a voltage (i3×r5) is generated where the resistance of the resistor R5 is r5. Accordingly, the reference voltage Vs2 becomes a summation of the voltage VLX and the voltage (i3×r5), and is expressed by the following (12)

$$Vs2 = VLx + i3 \times r5 \quad (12)$$

When the voltage (i3×r5) is defined as a predetermined voltage V1, formula (12) becomes $$Vs2 = VLx + V1 \quad (13)$$

Thus, in the switching regulator according to the second example embodiment, the reference voltage generation circuit 21 generates the reference voltage Vs2 by adding a predetermined voltage V1 to the voltage VLx, and the reference voltage Vs2 is input to the inverted input terminal of the comparator 13. As a result, the switching regulator according to the second example embodiment can shorten a delay time caused by the comparator 13 in addition to providing an effect similar to that of the switching regulator according to the first example embodiment. Further, it is possible to shorten a required time to detect a generation of the reverse current, and to start a preventing operation to prevent the reverse current quickly when the reverse current starts to occur.

Third Embodiment

Figure 9:
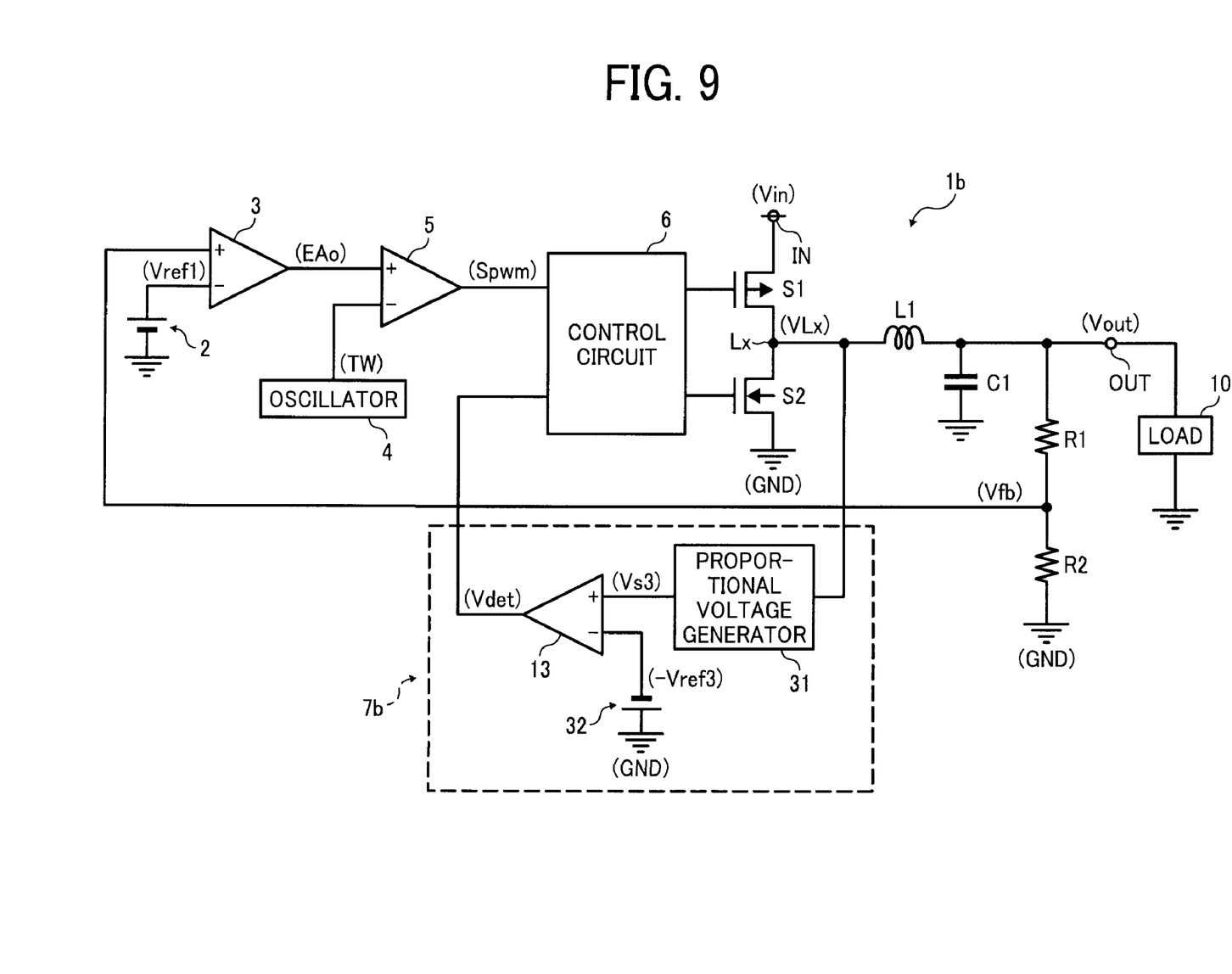
FIG. 9 is a circuit diagram of a switching regulator according to a third example embodiment.

In the switching regulator according to the first example embodiment, the proportional voltage generator 11 generates and outputs a proportional voltage Vs1 proportional to the voltage VLx. In a switching regulator according to a third example embodiment, a proportional voltage Vs3 is created by multiplying the voltage VLx by a factor k, and a negative reference voltage −Vref3 is input to the inversion terminal of the comparator 13.

FIG. 9 is a circuit diagram of a switching regulator 1b according to the third example embodiment. In FIG. 9, identical reference characters are assigned to circuit members that are identical or similar to those shown in FIG. 2 and descriptions thereof are omitted.

The switching regulator 1b shown in FIG. 9 differs from the switching regulator 1 shown in FIG. 2 in that the proportional voltage generator 11 is replaced by a proportional voltage generator 31 which generates and outputs the proportional voltage Vs3 which is created by multiplying the voltage VLx by the factor k. Further, the second reference voltage generator 12 is replaced by a third reference voltage generator 32 which generates and outputs a predetermined negative reference voltage −Vref3. Accordingly, the reverse current detector 7 is changed to a reverse current detector 7b.

The switching regulator 1b is a step-down switching regulator which converts an input voltage Vin input at an input terminal IN to a predetermined voltage, and outputs the converted voltage as an output voltage Vout from an output terminal OUT to a load 10.

The switching regulator 1b includes a switching transistor SI, a synchronous rectification transistor S2, a first reference voltage generator 2, resistors R1 and R2, an inductor L1, an error amplifier 3, an oscillator 4, a PWM comparator 5, a control circuit 6, and the reverse current detector 7b. The reverse current detector 7b includes the proportional voltage generator 31, the third reference voltage generator 32, and a comparator 13. The reverse current detector 7b forms a reverse current detection circuit unit, and the third reference voltage generator 32 forms a third reference voltage generation circuit.

Excepting the inductor L1 and a capacitor C1, all the circuit elements may be integrated on a single chip. Further, excepting switching transistor S1, the synchronous rectification transistor S2, the inductor L1 and a capacitor C1, all the circuit elements may be integrated on a single chip.

The reverse current detector 7b detects an indication of a reverse current that flows from the output terminal OUT to the synchronous rectification transistor S2. When the reverse current detector 7b detects an indication of a reverse current, the reverse current detector 7b outputs a predetermined comparison result signal Vdet to the control circuit 6. The control circuit 6 switches off the synchronous rectification transistor S2 to create a shutdown state to prevent the reverse current.

In the comparator 13, the proportional voltage Vs3 is input to a non-inversion terminal, and the negative reference voltage −Vref3 is input to an inversion terminal. The comparator 13 generates and outputs the comparison result signal Vdet indicating a comparison result between the proportional voltage Vs3 and the negative reference voltage −Vref3 to the control circuit 6.

Figure 10:
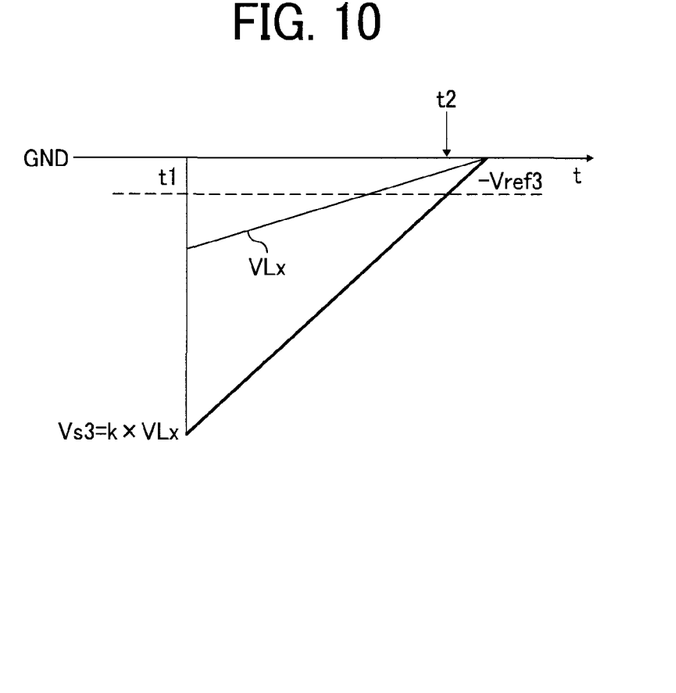
FIG. 10 is a schematic representing a relation among a proportional voltage, a reference voltage, and a voltage at a junction node between a switching transistor and a synchronous rectification transistor in the switching regulator according to the third example embodiment.

FIG. 10 is a schematic diagram representing a relation among the voltage VLx, the proportional voltage Vs3 and the third reference voltage −Vref3. Here, k in FIG. 4 is replaced by −k, and −k in FIG. 4 is replaced by k in FIG. 10. The proportional voltage Vs1 is replaced by the proportional voltage Vs3, and the second reference voltage Vref2 is replaced by the third reference voltage −Vref3.

In the switching regulator according to the first example embodiment, the proportional voltage Vs1 is generated by multiplying the voltage VLx by a factor −k. By contrast, in the switching regulator according to the third example embodiment, the proportional voltage Vs3 is generated by multiplying the voltage VLx by a factor k. Accordingly, the proportional voltage generation circuit 31 can be achieved by a simple circuit.

As a result, the switching regulator according to the third example embodiment can simplify the proportional voltage generation circuit so that the proportional voltage generation circuit can be made compact in addition to providing an effect similar to that of the switching regulator according to the first example embodiment.

Moreover, the proportional voltage generation circuit 11 used in the switching regulators according to the first and second example embodiments is not intended to be limited to the circuit configuration shown in FIG. 3.

Figure 11:
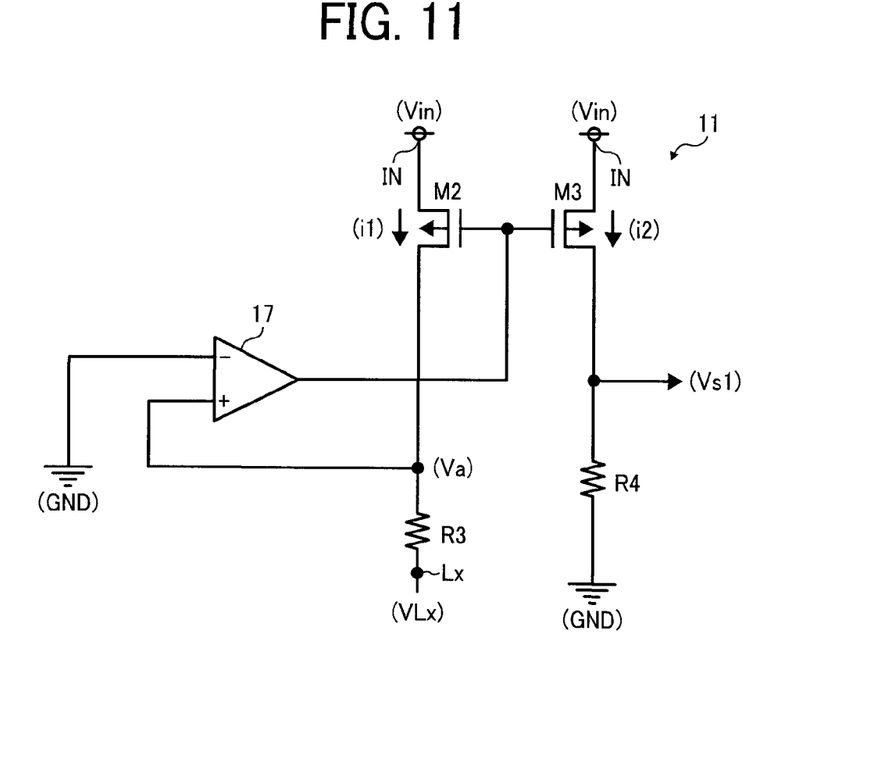
FIG. 11 is another example of a proportional voltage generation circuit.

FIG. 11 is another example of the proportional voltage generation circuit. In FIG. 11, identical reference characters are assigned to circuit members that are identical or similar to those shown in FIG. 3. The proportional voltage generation circuit 11 includes an operational amplifier 17, PMOS transistors M2 and M3, resistors R3 and R4. The PMOS transistor M2 forms a first transistor, and the PMOS transistor M3 forms a second transistor.

In the PMOS transistors M2 and M3, each source is connected to input terminal IN. Each gate of the PMOS transistors M2 and M3 is connected in common, and connected to an output terminal of the operational amplifier 17. The resistor R3 is connected between a drain of the PMOS transistor M2 and the node Lx. A junction node between the PMOS transistor M2 and the resistor R3 is connected to the non-inversion terminal of the operational amplifier 17. An inversion terminal of the operational amplifier 17 is connected to ground. The resistor R4 is connected between a drain of the PMOS transistor M3 and ground. The proportional voltage Vs1 is output from a junction node between the PMOS transistor M3 and the resistor R4. A formula representing the proportional voltage Vs1 of FIG. 10 is equal to the formula for the proportional voltage generation circuit of FIG. 3.

Figure 12:
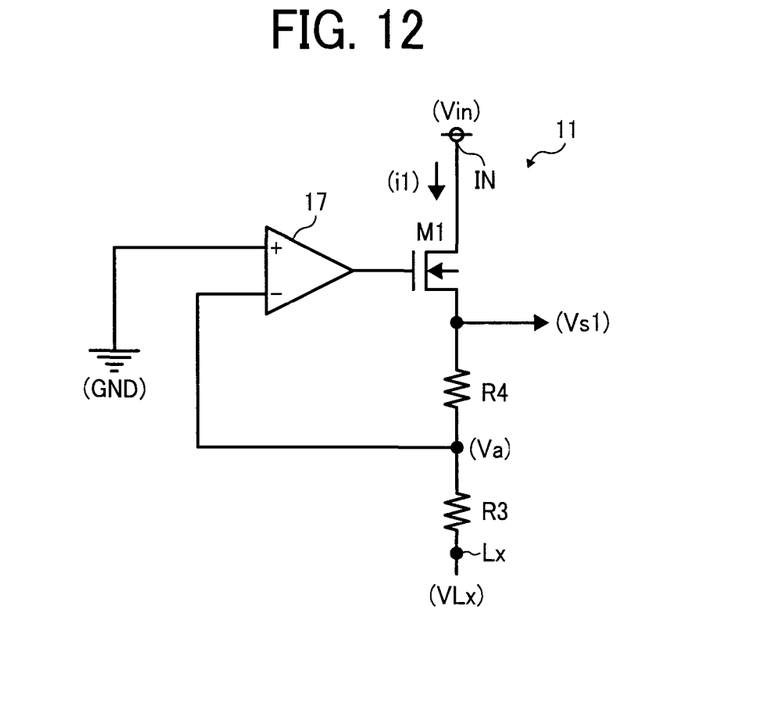
FIG. 12 is another example of a proportional voltage generation circuit using an NMOS transistor.

FIG. 12 is another example circuit of the proportional voltage generation circuit. In FIG. 12, identical reference characters are assigned to circuit members identical or similar to those shown in FIG. 3. The proportional voltage generation circuit 11 includes an operational amplifier 17, an NMOS transistors M1, and resistors R3 and R4. A drain of the NMOS transistor M1 is connected to the input terminal IN. The resistors R3 and R4 are connected in series between a source of the NMOS transistor M1 and the node Lx. A gate of the NMOS transistor M1 is connected to an output terminal of the operational amplifier 17. A junction node between the resistors R3 and R4 is connected to an inversion terminal of the operational amplifier 17. A non-inversion terminal of the operational amplifier 17 is connected to ground. The proportional voltage Vs1 is output from a junction node between the NMOS transistor M1 and the resistor R4.

Figure 13:
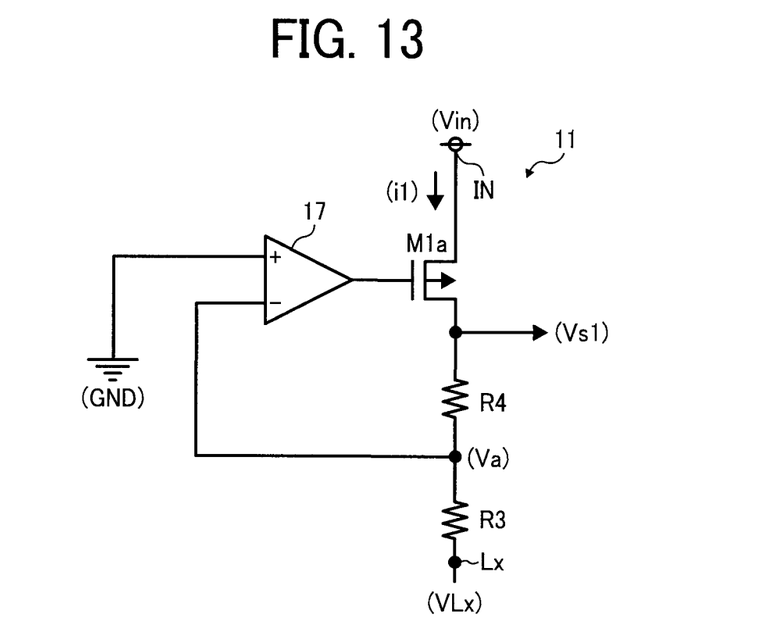
FIG. 13 is another example of a proportional voltage generation circuit using a PMOS transistor.

The NMOS transistor M1 in FIG. 12 can be replaced by a PMOS transistor M1a, and FIG. 13 is another example circuit of the proportional voltage generation circuit 11 using the PMOS transistor M1a. In both FIGS. 12 and 13, a proportional voltage Vs1 is expressed by the same formula (4) excepting the factor k. The factor k for FIGS. 12 and 13 is r4/r3 (k=r4/r3).

The switching regulators according to the first, second, and third example embodiments may be configured so that the proportional voltage generator detects whether or not the synchronous rectification transistor S2 is turned off to create a shutdown state based on the control signal output from the control circuit. When the synchronous rectification transistor S2 is turned off, the proportional voltage generator stops operation, or generates and outputs a voltage signal to cause the comparator 13 to output a high-level comparison result signal Vdet.

Numerous additional modifications and variations are possible in light of the above teachings. It is therefore to be understood that, within the scope of the appended claims, the disclosure of this patent specification may be practiced otherwise than as specifically described herein.

This patent specification is based on Japanese Patent Application, No. 2007-235065 filed on Sep. 11, 2007 in the Japanese Patent Office, the entire contents of which are incorporated by reference herein.

What is claimed is:

1. A switching regulator, comprising:
a first switch configured to switch in accordance with a first control signal;
an inductor configured to store charge from an input voltage by switching the first switch;
a second switch configured to discharge a charge stored in the inductor in accordance with a second control signal;
a controller that outputs the first control signal and the second control signal, configured to control a switching operation by switching the first switch and switching the second switch complementarily to the first switch, to obtain a constant output voltage; and
a reverse current detector configured to detect a reverse current that flows from an output terminal toward the second switch,
wherein the reverse current detector generates a proportional voltage that is proportional, but not equal, to a voltage at a junction node between the second switch and the inductor, and detects a generation or an indication of the reverse current based on the proportional voltage,
wherein the controller switches off the second switch to create a shutdown state when the reverse current detector detects the generation or the indication of the reverse current.

2. The switching regulator of claim 1,
wherein the reverse current detector generates the proportional voltage by multiplying the voltage at the junction node between the second switch and the inductor by a factor whose absolute value is larger than 1.

3. The switching regulator of claim 1,
wherein the reverse current detector compares the proportional voltage with a predetermined first reference voltage to detect the generation or the indication of the reverse current.

4. The switching regulator of claim 1,
wherein the reverse current detector generates a first reference voltage by adding a predetermined voltage to a voltage at the junction node between the second switch and the inductor,
wherein the reverse current detector compares the proportional voltage with the first reference voltage to detect the generation or the indication of the reverse current.

5. The switching regulator of claim 1,
wherein the reverse current detector generates a first reference voltage which has a predetermined slope dependence with respect to time, and the slope dependence of the first reference voltage is opposite in sign to a slope dependence of the proportional voltage,
wherein the reverse current detector compares the proportional voltage with the first reference voltage to detect the generation or the indication of the reverse current.

6. The switching regulator of claim 3,
wherein the reverse current detector comprises:
a proportional voltage generation circuit configured to generate and output a proportional voltage that is proportional to the voltage at the junction node between the second switch and the inductor;
a first reference voltage generation circuit configured to generate and output a first reference voltage;
a reverse current detection circuit configured to compare the proportional voltage with the first reference voltage to detect the generation or the indication of the reverse current and output a detection result signal to the controller,
wherein the proportional voltage generation circuit generates and outputs a proportional voltage that is proportional to a voltage difference between a predetermined second reference voltage and the voltage at the junction node between the second switch and the inductor.

7. The switching regulator of claim 6,
wherein the proportional voltage generation circuit comprises:
a first resistor connected to the junction node between the second switch and the inductor;
a first transistor configured to output a current to the first resistor in accordance with a signal input to a control terminal;
an operational amplifier, one input terminal of which is connected to the first resistor, the second reference voltage is input to another input terminal, and an output terminal is connected to a control electrode of the first transistor;
a current mirror configured to output a proportional current that is proportional to an input current which flows through the first transistor;
and a current-voltage converter configured to convert the proportional current to a voltage to generate and output a proportional voltage that is proportional to the voltage at the junction node between the second switch and the inductor.

8. The switching regulator of claim 6,
wherein the proportional voltage generation circuit comprises:
a first resistor connected to a junction node between the second switch and the inductor;
a first transistor configured to output a current to the first resistor in accordance with a signal input to a control terminal;
an operational amplifier, one input terminal of which is connected to the first resistor, the second reference voltage is input to another input terminal, and an output terminal is connected to a control electrode of the first transistor;
a second transistor configured to output a proportional current that is proportional to a current that flows through the first transistor, an output signal of the operational amplifier being input to a control gate thereof; and
a current-voltage converter configured to convert the proportional current to a voltage to generate and output a proportional voltage that is proportional to the voltage at the junction node between the second switch and the inductor.

9. The switching regulator of claim 6,
wherein the proportional voltage generation circuit comprises:
a series-resistor formed of the first resistor and a second resistor, the first resistor connected to the junction node between the second switch and the inductor;
a first transistor configured to output a current to the series-resistor in accordance with a signal input to a control terminal thereof; and an operational amplifier, one input terminal of which is connected to a junction node of the first resistor and the second resistor, the second reference voltage being input to another input terminal, an output terminal of which is connected to a control electrode of the first transistor, wherein a proportional voltage that is proportional to the voltage at the junction node between the second switch and the inductor is output from a junction node between the first transistor and the series-resistor.

10. The switching regulator of claim 5, wherein the reverse current detector comprises:

a proportional voltage generation circuit configured to generate and output a proportional voltage that is proportional to the voltage at the junction node between the second switch and the inductor;

a first reference voltage generation circuit configured to generate and output a first reference voltage; and a reverse current generation circuit configured to compares the proportional voltage with the first reference voltage to detect the generation or the indication of the reverse current and output a detection result signal to the controller, wherein the proportional voltage generation circuit generates and outputs the proportional voltage that is proportional to a voltage difference between a predetermined second reference voltage and the voltage at the junction node between the second switch and the inductor.

11. The switching regulator of claim 6, wherein the second reference voltage is a ground potential.

12. The switching regulator of claim 7, wherein the current-voltage converter comprises a second resistor formed in the same manufacture process for the first resistor.

13. The switching regulator of claim 8, wherein the first and second transistors have the same conductivity.

14. The switching regulator of claim 9, wherein the first and second resistor are formed in a manufacture process.

15. The switching regulator of claim 6, wherein the proportional voltage generation circuit operates when the second switch is turned on to create a conduction state, and stops operating when the second switch is turned off to create a shutdown state.

16. The switching regulator of claim 6, wherein the proportional voltage generation circuit generates and outputs a large voltage that is larger than the first reference voltage when the second switch is turned off to create a shutdown state.

17. The switching regulator of claim 1, wherein the first and second switches, the controller, and the reverse current detector are formed on a single chip.

18. A reverse current detection and control method for a switching regulator, the switching regulator comprising:

a first switch configured to switch in accordance with a first control signal;

an inductor configured to store charge from an input voltage by switching the first switch;

a second switch configured to discharge a charge stored in the inductor in accordance with a second control signal;

a controller that outputs the first control signal and the second control signal, configured to control a switching operation by switching the first switch and switching the second switch complementarily to the first switch to obtain a constant output voltage; and a reverse current detector configured to detect a reverse current that flows from an output terminal toward the second switch, the reverse current detection and control method comprising:

generating a proportional voltage that is proportional, but not equal, to a voltage at a junction node between the second switch and the inductor using the reverse current detector;

detecting a generation or an indication of the reverse current based on the proportional voltage thus generated; and switching off the second switch to create a shutdown state using the controller when the reverse current detector detects the generation or the indication of the reverse current.

* * * * *